L. R. WIGGIN.
Sewing Machine.
No. 69,056.
Patented Sept. 17, 1867.
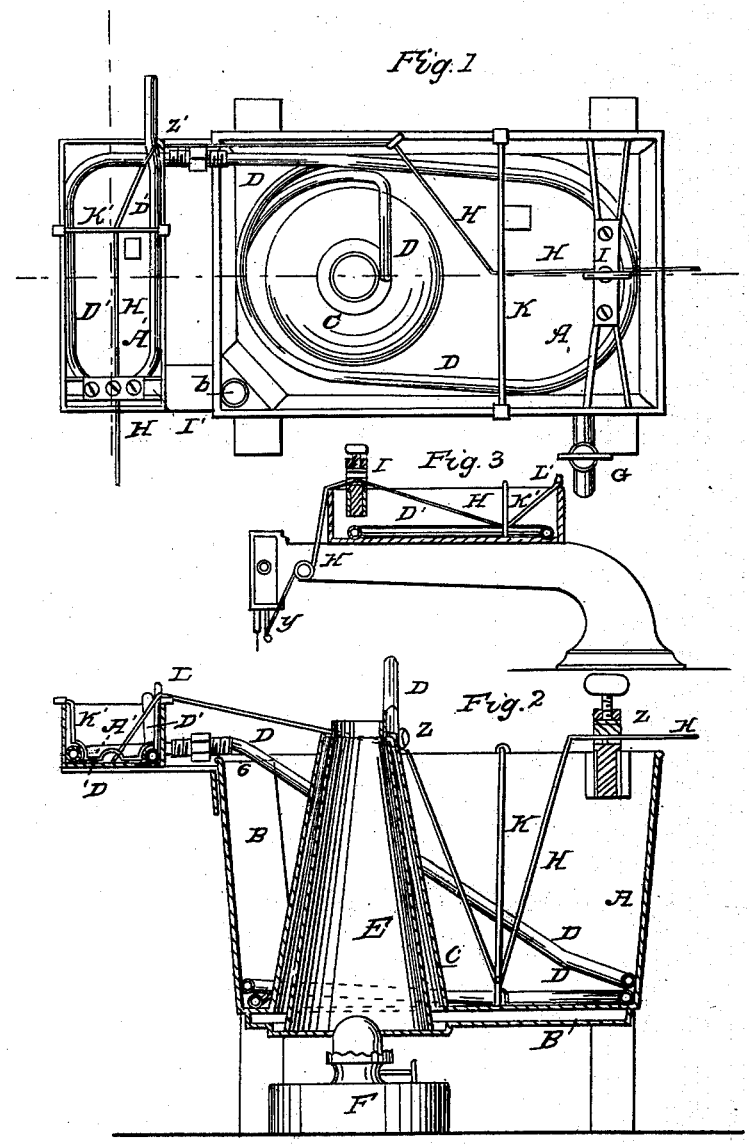

UNITED STATES PATENT OFFICE.

LEWIS R. WIGGIN, OF FARMINGTON, NEW HAMPSHIRE.

IMPROVEMENT IN THREAD-WAXING DEVICE FOR SEWING-MACHINE.

Specification forming part of Letters Patent No. 69,056, dated September 17, 1867.

*To all whom it may concern:*

Be it known that I, LEWIS R. WIGGIN, of Farmington, Strafford county, New Hampshire, have invented a new and Improved Thread-Waxing Device for Sewing-Machines; and I do hereby declare that the following is a full, clear, and exact description thereof, which will enable others skilled in the art to make and use the same, reference being had to the accompanying drawings, forming part of this specification.

This invention relates to a device for heating tar, wax, glue, blacking, oil, and other articles used for chemical and mechanical purposes; and consists of a double-bottomed tank or receptacle for the substance to be heated, and of a standard through which water is conveyed between the two bottoms, and rising into a steam-generator, from the top of which passes a worm coiled in the tank. A chimney passes through the steam-generator, at base whereof a petroleum or kerosene lamp or other source of heat is placed.

As applied to wax-thread sewing-machines, the thread passes through a rubber presser into and is guided through the melted wax or other substance, and either passes out through another rubber presser direct to the needle-bar of the sewing-machine, or is guided into and through another tank or receptacle, in which a continuation of the worm is disposed, and thence to the bracket and needle-bar.

In the accompanying drawings, Figure 1 is a top view of my improved thread-waxing device for sewing-machine. Fig. 2 is a longitudinal section thereof at the line $xx$, and Fig. 3 exhibits a thread guided through the supplemental tank to the needle-bar.

Similar letters of reference indicate corresponding parts.

A is the tank or receptacle for the wax, tar, or other substance to be heated; B, the water-chamber, supplied from $b$, communicating with the steam-generator C, the steam-worm D receiving the steam from C, being coiled in A, and heating the wax or other substance placed in the receptacle; or the steam-generator C might be dispensed with, and the worm D receive the steam from a point in B near $b$. The chimney E passes through the steam-generator C, the petroleum-lamp F or other source of heat being disposed at the base of the chimney. The water can be drawn off when so desired by the faucet G. H is the thread to be waxed, passing through the rubber presser I, guided through the tank A by the guide K and eyes L L', into the supplementary tank A', containing the wax or other substance with which the thread is to be coated, and which is heated by the prolongation D' of the worm D. The thread H is guided through the tank A' by the guide K to the rubber presser I, and thence to the needle-arm Y.

Having thus described my invention, what I claim as new, and desire to secure by Letters Patent, is—

1. The tank A, water-chamber B, and steam worm or tube D, combined and arranged substantially as and for the purposes above set forth and described.

2. The supplementary tank A', and prolongation D' of the worm or steam-tube D, and rubber presser I, in combination with the tank A, steam-generator C, and worm D, substantially as and for the purposes above set forth and described.

The above specification of my invention signed by me this 8th day of April, 1867.

LEWIS R. WIGGIN.

Witnesses:
JOHN E. BROWN,
GEORGE N. EASTMAN.